United States Patent Office 3,360,330
Patented Dec. 26, 1967

3,360,330
TREATMENT OF COMBUSTIBLE WASTE
PRODUCTS AND CATALYST THEREFOR
James Hoekstra, Evergreen Park, Ill., assignor to Universal Oil Products Company, Des Plaines, Ill., a corporation of Delaware
No Drawing. Filed Aug. 28, 1964, Ser. No. 392,918
8 Claims. (Cl. 23—2)

ABSTRACT OF THE DISCLOSURE

Oxidation of noxious exhaust gases in contact with a barium chromate-containing catalyst prepared by impregnating a refractory inorganic support, such as alumina, successively with a catalytically active component, such as platinum, then with barium hydroxide and then with chromic acid, followed by drying and calcining.

The present invention relates to the treatment of combustible waste products, prior to discharging the same into the atmosphere, and involves the preparation of an improved catalytic composite having a novel physical structure and composition and the use of such catalytic composite.

More specifically, the invention described herein is directed toward the use of an oxidation catalyst incorporating a barium chromate to enhance its stability and activity for effecting the conversion of auto exhaust gases or other gaseous, combustible waste products of a noxious nature, into innocuous components for the primary purpose of eliminating the adverse effects exhibited by such waste products upon the atmosphere. The added component to the catalytic composite may be embodied as barium chromate or as a barium dichromate. The term "a barium chromate" as used herein will mean either barium chromate ($BaCrO_4$) or barium dichromate ($Ba_2CrO_7$).

While the catalytic composite encompassed by the present invention is especially adaptable to the elimination of the products of incomplete combustion from the hydrocarbonaceous exhaust gases emanating from an internal combustion engine, prior to effecting the discharge of such hydrocarbonaceous exhaust gases into the atmosphere, there are also other obnoxious products which may well be treated. For example, unsaturated hydrocarbons, alcohols, ketones, aldehydes, acids, etc., as well as carbon monoxide and oxides of nitrogen and sulfur, etc., comprise objectionable materials.

The desirability and importance of effecting the removal of noxious components from automative exhaust gases, or the conversion thereof into innocuous components, is now well recognized. At least one state, California, has passed legislation recognizing the inherent danger to the public health and welfare as such noxious gaseous material continues to be discharged into the atmosphere, and, in this regard, has appropriately instituted a Motor Vehicle Pollution Control Board having as its primary purpose the elimination or conversion of these noxious components.

The primary object of the present invention is, therefore, to provide a method for the catalytic treatment, and the catalyst for use therein, of noxious combustible gaseous waste products for the purpose of eliminating the noxious material and/or converting the same into innocuous components. A related object is to produce a catalytic composite having a novel composition and physical structure and the propensity for effecting the oxidation of a hydrocarbon-containing mixture including carbon monoxide, as well as the capability to effect such conversion for a prolonged period of time where catalyst operating temperatures are low. Catalysts being used for the oxidation of exhaust gases from engines operating on regular commercial motor fuels have been found to undergo rapid deactivation because of lead deposition from the exhaust gas, particularly under what may be considered low emission conditions where the catalyst does not at least periodically reach high temperatures of 1500° F. or more.

Broadly, the present invention provides an improved method for effecting the conversion of a noxious exhaust gas stream which comprises contacting said stream at conversion conditions, with a catalytic composite of a refractory inorganic oxide base material carrying an active metal component and a barium chromate.

Prior associated work has discovered the improved oxidation and/or conversion of waste gases through the use of a low density porous alumina carrier material having a catalytically active oxidizing component composited therewith. Platinum, palladium and other noble metal components are preferred, although an oxide of one or more metals from Groups I–B, V–B, VI–B and VIII may comprise a desirable active metal component for the composite.

Another broad embodiment of the present invention encompasses a catalytic particle comprising an inorganic oxide carrier material and a catalytically active metallic component of the platinum group of metals, and a barium chromate coating.

Still another embodiment of the present invention involves a method of preparing an improved oxidation catalytic composite which comprises impregnating an inorganic oxide carrier material with a solution of a platinum group metal compound to provide from about 0.01% to about 1.0% of the platinum group metal, based upon the weight of the carrier, drying and reducing the impregnated carrier, subsequently impregnating the reduced composite with a barium oxide solution, drying this composite and impregnating it with a chromic acid solution to form a resulting barium chromate deposition on said catalyst, and then drying and calcining the composite at an elevated temperature.

Prior associated work has discovered the improved oxidation and/or conversion of exhaust gases, particularly engine exhaust gases containing lead, through the use of an impregnating agent to assist in positioning the active metal component layer a finite distance below a surface of the carrier material. The impregnating agent is preferably an organic acid selected from the group consisting of polybasic acids and derivatives thereof, having the following structural formula:

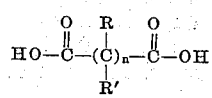

where:

R is selected from hydrogen, hydroxyl and alkyl groups;
R' is selected from hydrogen, alkyl and carboxyl groups; and $n$ is within the range of 0 to 6.

Citric acid has been found to be a particularly suitable polybasic acid material that is readily available for use in combining with the solution of the metal salt for the active oxidizing component on the catalyst. As will hereinafter be set forth with certain examples, citric acid had been utilized along with chloroplatinic acid to provide for the impregnation of the platinum component onto the carrier material such that there is impregnation below the surface of the latter. However, in accordance with the structural formula given above, suitable organic acids for use in preparing the catalytic composite of the present invention include, but not by way of limitation, oxalic, malonic, succinic, glutaric, adipic, pimelic, suberic, malic, tartaric, citric, 2-methyl succinic, 2,3-di-ethyl succinic, 2,2-dimethyl succinic, mixtures of two or more etc. The quantity of the polybasic organic acid, or derivative thereof, for example, citric acid, to be employed in admixture with the water-soluble compound of the catalytically active metallic component and the carrier material, is based upon the weight of such carrier material. The amount of organic acid employed is within the range of about 0.1% to 1.5% by weight. An intermediate concentration of the organic acid and/or its derivative is preferred, and is within the range of from about 0.13% to about 0.70% by weight, based upon the weight of the carrier material. Through the utilization of the method of treating the carrier material with a particular quantity of a particular organic acid, the use of lesser quantities of the active metallic components to achieve the desired end may also result.

A more specific embodiment of the present invention provides a method for converting a noxious exhaust gas stream to less objectionable components by contacting such stream at conversion conditions with catalytic composite particles of low density porous alumina, platinum and a barium chromate prepared by commingling said alumina with chloroplatinic acid to provide from about 0.01% to about 1.0% platinum by weight of the composite, drying the resulting mixture at a temperature within the range of from about 100° F. to about 250° F., subsequently subjecting the mixture to an atmosphere of hydrogen at a temperature within the range of from about 200° F. to about 1800° F., thereafter impregnating the resulting material with a solution of barium oxide to provide from about 2% to 30% barium by weight of the resulting catalyst, drying the thus impregnated composite and then impregnating it with a chromic acid solution in an amount to effect combination with the barium and the formation of a barium chromate on the composite and then subsequently drying and calcining it at an elevated temperature to provide the finished catalyst composite.

Although platinum is the preferred activating component, as set forth in the present specification, as well as in the appended examples, the term "metallic component" is intended to connote those components of the catalyst which are employed for their catalytic activity in converting the noxious material into innocuous components, as distinguished from that portion of the catalyst herein referred to as the refractory inorganic oxide, and which is employed for the purpose of supplying a suitable carrier material, or support, for the "catalytically active metallic components." Although not considered to be a limiting feature of the present invention, it is preferred that the catalytically active metallic component, or components, be composited with a refractory inorganic oxide carrier material which has an apparent bulk density less than about 0.4 gram per cc. Preferred refractory inorganic oxides, for use as the carrier material, possess an apparent bulk density within the range of about 0.15 to about 0.35 gram per cc. The catalyst of the present invention may contain a metallic component selected from Groups I–B, V–B, VI–B and VIII of the Periodic Table. Thus, the catalyst to be employed in the treatment of noxious, gaseous combustible waste products, prior to discharging the same into the atmosphere, may comprise the following: Platinum, palladium, other noble metals such as iridium, ruthenium, and rhodium, iron, cobalt, nickel, copper, vanadium, tungsten, molybdenum, silver, gold and various mixtures including platinum-iron, platinum-cobalt, platinum-nickel, palladium-iron, palladium-cobalt, palladium-nickel, platinum-palladium, palladium-copper-cobalt, copper-cobalt-nickel-platinum, platinum-palladium-cobalt, etc. It is understood that the catalytic activity, stability, auto-initiating temperature, and other characteristics of the catalyst of the present invention, may vary from catalyst to catalyst. Many of the specific catalytic composites discussed herein do not necessarily yield equivalent results when compared with a catalyst comprising one or more different metallic components, or when utilized under varying conditions in different applications. Although the precise manner in which the catalytically active metallic component, such as platinum, is disposed within the carrier material, is not known with absolute certainty, it is believed that the platinum, or other metallic component, enters into a complex combination with the carrier material and other components of the catalyst. Therefore, it is understood that the use of the term "platinum" or "metallic component," for example, connotes platinum or other metallic components existing within the carrier material in a combined form and/or in the elemental state.

The catalytic composite of the present invention, the method of which is hereinafter set forth in greater detail, utilizes a refractory inorganic oxide as the carrier material for the active metallic components hereinbefore set forth. Refractory inorganic oxides possess particular physical characteristics which readily permit adaptation thereof to the rather unique environment encountered in the operation of a motor vehicle, as well as in other commercial application. One desired physical characteristic, for example, is that extremely high temperatures do not apparently affect the capability of the material to function as desired. The refractory inorganic oxide carrier material, for utilization in the catalyst of the present invention, may be manufactured by any suitable method including separate, successive, co-precipitation means of manufacture when comprising two or more individual inorganic oxides. The carrier material may comprise naturally-occurring substances such as clays, or earths, and may or may not be activated prior to use by one or more treatments including drying, calcining, steaming or treatments with various reagents, etc. The catalytic *composite* of the present invention will preferably make use of an alumina-containing refractory inorganic oxide carrier material: as employed herein, the term "alumina" is intended to include porous aluminum oxide in various states of hydration. In addition to alumina, other refractory inorganic oxides may be employed, either in conjunction with, or instead of, the alumina. Other suitable inorganic oxides include silica, boria, thoria, titania, zirconia, hafnia, and mixtures of two or more. The incorporation of any of the foregoing refractory inorganic oxides, in conjunction with the alumina, is generally dependent upon the desire to add thereto certain physical and/or chemical characteristics required by the particular application for which the catalytic composite is intended. Such other refractory inorganic oxides, for example, silica will be present within the carrier material in an amount within the range of about 0.5% to about 25.0% by weight thereof, based upon the final weight of the carrier. Intermediate quantities are preferred and will lie within the range of about 1.0% to about 10.0% by weight. The carrier material may take the form of any desired shape such as spheres, pills, extrudates, granules, cakes, briquettes, rings, etc. The preferred form is the low density sphere, and spheres may be continuously manufactured by the well-known oil-drop method: this method is described in detail in U.S. Patent No. 2,620,314 issued to James Hoekstra. In the interest of simplicity and clarity, the following discussion will be restricted to the use of alumina as the refractory inorganic oxide carrier material.

The quantity of the catalytically active metallic components is based upon the volume of the carrier material to be combined therewith, and is calculated on the basis of the elemental metal, notwithstanding that the metallic component may exist in some combined complex form, or in the elemental state. Thus, with respect to platinum group metals, the platinum will be present in an amount of from about 0.05 to about 2.0 troy ounces per cubic foot of carrier material, or within the range of from about .01% to about 0.1% of platinum, by weight of the composite. The preferred range of the concentration of the platinum component, dictated by economic considerations, is from about 0.15 to about 0.60 troy ounce per cubic foot of carrier material. The other metallic components, either in conjunction with, or instead of, the platinum component will be present in an amount of from about 0.01 to about 2.0 troy ounces per cubic foot of carrier material employed.

In preparing the catalytic composition with a barium chromate, the latter is preferably added to the composite after the active metal impregnation. As for example, after the carrier spheres have been impregnated with platinum and reduced in a stream of hydrogen beginning at room temperature and going up to about 1000° F., then the cooled spheres may be first impregnated with a solution of barium oxide in an amount and for a period of time to provide the desired quantity of barium in the resulting dried and calcined composite. Following the barium oxide deposition, the composite may be then impregnated with a solution of chromic acid such that a barium chromate is formed by a reaction on the surface of the alumina-platinum composite. As indicated hereinbefore, the added component may be the barium chromate ($BaCrO_4$) or the dichromate ($BaCr_2O_7$). Following the double impregnation the catalyst may be calcined in air for at least about 1 hour at 1000° F. The amount of barium chromate may vary to provide from 2% to about 30% by weight of barium on the finished composite, although it appears that barium in an amount of from about 5% to about 10% provides a preferable range for the substantially improved catalyst with good stability and that greater amounts of barium in the composite may be unnecessary. Actual operating conditions effecting the conversion of a particular noxious exhaust stream can, of course, effect any particular composite such that varying amounts of barium chromate may be found to be optimum in connection with the conversion of a particular engine exhaust gas stream.

In describing a method of manufacturing the catalytic composite encompassed by the present invention, it is understood that the same is not considered to be unduly limited to the particular catalytic composite described. The catalyst, in one example, is prepared by initially forming alumina spheres, 1/16-inch to about 3/16-inch in diameter, from an aluminum chloride hydrosol having an aluminum chloride weight ratio of about 1.25. The alumina spheres are continuously prepared by passing droplets of the hydrosol into an oil bath maintained at an elevated temperature, retaining the droplets within the oil until the same set into hydrogel spheroids. The spheroids are dried at a temperature of from about 200° F. to about 800° F. and thereafter subjected to a calcining treatment at a temperature of from about 800° F. to about 1200° F. An impregnating solution of chloroplatinic acid, having the concentration of 0.0628 gram of platinum per milliliter is prepared by diluting 3.0 milliliters to about 500 milliliters with water. When utilized with the approximatey 150 grams of the alumina spheres, having an apparent bulk density of about 0.29 gram per cc., this concentration of the chloroplatinic acid solution will yield a final composite having about 0.32 troy ounces of platinum per cubic foot of the spherical alumina carrier material. The chloroplatinic acid solution is commingled with about 0.52 grams of citric acid, or about 0.35% by weight based upon the weight of the spheres. The resulting mixture of citric acid, chloroplatinic acid and alumina spheres is evaporated to dryness in a rotating dryer at a temperature of about 210° F. When the spheres appear visually dry, usually in about 2 to about 8 hours, the impregnated spheres are subjected to a reducing treatment, preferably in an atmosphere of hydrogen, while increasing the temperature to a level within the range of about 200° F. to about 1800° F., maintaining the elevated temperature for about 2 hours. Contrary to present-day methods of manufacturing catalytic composites, the catalyst prepared with citric acid present is not subjected to an oxidation treatment at elevated temperature, or to high-temperature calcination in an atmosphere of air. In this instance, a high temperature oxidation treatment tends to destroy both the initial activity, and more particularly, the stability of the catalytic composite to effect the removal and/or conversion of the noxious components in the combustible gaseous waste products.

The following examples are given for the purpose of illustrating the method of manufacturing and using the catalytic composite encompassed by the present invention. It is understood that the present invention is not to be unduly limited beyond the scope and spirit of the appended claims, by the conditions, reagents, concentrations or catalytic composites employed within the examples. The data presented within the examples will indicate the benefits to be afforded by the present invention, which invention utilizes a catalytic composite having a catalytic amount of an active metal component and an additive barium chromate component. It will be readily ascertained that the catalytic composite offers particular advantages in a process for the elimination of the products of incomplete combustion from the hydrocarbonaceous exhaust gases emanating from an internal combustion engine, by which method such exhaust gases become innocuous upon being discharged into the atmosphere.

Also, the following examples described comparative experimental composites which were employed in obtaining data to evaluate the improved catalyst and methods of preparation, as well as use in effecting conversion of hydrocarbons and carbon monoxide in an engine exhaust gas stream. A specific catalyst evaluation test procedure was utilized that was designed to determine the catalytic stability with respect to automotive exhaust conversion. The various catalytic composites are evaluated by a test procedure which simulates actual driving conditions. The test procedure involves the utilization of a standard dynamometer, by which an eight-cylinder internal combustion engine is loaded by a motor generator. Approximately 580 cc. of each of the catalyst portions are individually evaluated by each being placed within a cylindrical vessel, or converter, having an inside diameter of about 6.5 inches, the entire apparatus being serially connected into the engine exhaust line. In each case, the catalyst sample is disposed within the converter on a supporting screen to a bed height of about one inch. A second screen is placed above the catalyst bed. The converter is designed to facilitate the even distribution of the exhaust gases flowing downwardly through the catalyst bed. Four such catalyst loaded converters are utilized in a given test period; this practice permits the simultaneous testing of different catalysts and provides an excellent basis for making a comparative study of the results.

Combustion air is supplied to the converted inlet by a pump driven by a pulley attached to the crankshaft of the engine. The fuel employed in the test procedure is a blend of catalytically reformed gasoline (40.0%), catalytically cracked gasoline (40.0%) and alkylate (20.0%), and contains 3.0 milliliters of tetraethyl lead per gallon. Since the concentration of unburned hydrocarbons, and other noxious products, within the exhaust gases, as well as the throughput thereof, varies in accordance with the physical status of the engine, whether idling, accelerating, cruising, or decelerating, the test procedure still further approximates actual road conditions by providing for a constant load throughout only a portion of the entire test period. Samples of the converter inlet and outlet gases are taken at various intervals during the test procedure, thereby being a constant analysis for the concentration of carbon monoxide. The samples are analyzed for hydrocarbons by a flame-ionization detector. The term "hydrocarbon," as utilized in reporting the results of the analyses performed on the effluent gases from the catalytic converter, connotes all hydrocarbons whether saturated, unsaturated, or partially oxidized as hereinbefore set forth. The carbon monoxide concentration within the exhaust gases is determined by an accurate infra-red detector. The internal combustion engine is operated in a particular cycle to simulate idling, accelerating, cruising and decelerating as experienced under actual road conditions. During the entire test procedure, which covers a period of about 40 hours, about 90 gallons of the aforementioned fuel is employed. The 40-hour test period consists of a series of two-minute cycles comprising idling at 600 r.p.m., accelerating to cruise at 2200 r.p.m., and a deceleration to idling at 600 r.p.m.

An inherent result of the small volume of catalyst employed in the test evaluation procedure is that the space velocity of the exhaust gases coming into contact with the catalyst is considerably higher than would usually be encountered under actual driving conditions. Accordingly, the percentage conversion obtained during actual use in automotive exhaust gas converts would be considerably higher. The data obtained from the 10 hour to 40 hour test procedure is also used to arrive at a slope or rate of deactivation. The difference between the 10 hour percentage of conversion and the 40 hour conversion is divided by 30 to provide a deactivation rate per hour, based upon differences in percent of conversion. A low rate of deactivation indicates a catalyst possessing a greater degree of stability when converting carbon monoxide and the hydrocarbonaceous combustion products of an internal combustion engine.

The foregoing described test procedure is employed as a primary evaluation of the catalysts. The importance of this evaluation resides in the over-all activity or conversion, as well as stability of the catalytic composite being tested. That is, although the wide variety of catalytic composites possess a relatively high initial activity, the stability of such catalysts is such that the maximum tolerable limits imposed upon the hydrocarbon and carbon monoxide concentrations are reached in a relatively short period of time. The ⅛-inch diameter alumina spheres, used as the base or carrier for all composites of the following examples, were prepared by the same procedure and had substantially the same physical characteristics and low apparent bulk density of the order of 0.28 gram per cubic centimeter.

To provide an evaluation of the physical strength of various of the catalyst composites, representative samples of each test catalyst were subjected to a standard test procedure to determine the "peripheral crushing strength" (PCS) thereof. The average crushing strength of a particle is determined as the arithmetic average of the force required to crush each particle of a given number of individual particles. Each particle is crushed in an apparatus constructed in such a manner that the force is applied continuously and at a uniform rate beginning with a zero load.

The crushing strength apparatus consists essentially of a balance beam resting on a knife edge. The knife edge is located at a unit distance from an anvil on which the catalyst particle is placed. A cup, which receives the lead shot by which the load is applied, is situated on the other side of the knife edge, four times the unit distance therefrom. The lead shot falls into this cup from a hopper at a rate of about nine pounds per minute, thus loading the particle at a rate of about 36 pounds per minute. A single particle is placed on the anvil of the apparatus, and the beam balanced by means of a small spirit level. Force is applied to the particle by opening the shutter in the bottom of the hopper containing the lead shot, thus allowing the shot to flow in a continuous stream into the cup. The flow of the lead shot is immediately, and automatically, cut off when the particle is completely crushed. The weight of lead shot within the cup is multiplied by a factor of four to give the actual peripheral crushing strength of the particle. The procedure is repeated 30 times and the crushing strength taken as the arithmetic average of the observed individual crushing strengths.

*Example I*

In order to provide a catalyst for comparison to the use of improved catalysts containing barium chromate, a reference catalyst was prepared. The ⅛-inch alumina spheres were impregnated with a sufficient quantity of a mixture of citric acid and chloroplatinic acid to yield a catalyst containing 0.47 troy ounce of platinum, calculated as the element thereof, per cubic foot of alumina. The citric acid was present in an amount to provide a molar ratio of 1.25 citric acid to platinum in the impregnating solution. Subsequently the spheres were evaporated to dryness in a rotating dryer at a temperature of about 210° F. Then, while increasing the temperature to a level of about 1000° F., the catalyst was subjected to an atmosphere of hydrogen; after reaching a temperature level of 1000° F., the hydrogen treatment was continued at that temperature for a period of about two hours. The catalyst was allowed to cool in the reducing zone prior to being exposed to the atmosphere.

Upon testing the catalyst in accordance with the procedure outlined, it was found that this reference catalyst provided an initial hydrocarbon conversion of 65.1% and at the end of 40 hours a conversion of 49.3%, while the deactivation rate was 0.53. The carbon monoxide conversion was initially 82.7% and after 40 hours 77.2% with a deactivation rate of 0.18. After the 40 hour period, the lead retention was 11.2% and the peripheral crushing strength 5.1 pounds.

*Example II*

Alumina spheres were impregnated with chloroplatinic acid as described in Example I to also yield 0.47 troy ounce of platinum, calculated as the element thereof, per cubic foot of alumina. The resulting catalytically activated composite was then dried and reduced in the presence of hydrogen for an approximate two hour period at about 1000° F. The platinum-alumina spheres were then treated with a barium hydroxide solution to provide approximately 10% barium by weight of a finished composite. The barium impregnation was followed by a drying step at about 212° F. for 2 hours and then by another impregnation with a solution of chromic acid so as to form barium chromate directly on the surface of the catalyst composite. Following the double impregnation to obtain the barium chromate, the catalyst was dried and calcined at about 1000° F. for a two hour period. The finished oxidation catalyst had a deposition of 10% barium and 3.8% chromium by weight of the composite.

Upon testing, this catalyst was found to provide an initial hydrocarbon conversion of 71.2% and at the end of 40 hours a conversion of 61.0%, thus providing a lowered deactivation rate of 0.34. The CO conversion was initially 85.8% and after 40 hours 82.0% with a lowered deactivation rate of 0.13. Also after the 40 hour period the lead retention was 9.38% and the peripheral crushing strength 3.6 pounds. It may thus be noted that the reduced lead retention and improved conversion stability shows significantly better results than those of the reference catalyst.

*Example III*

The alumina spheres were impregnated in this instance with a mixture of chloroplatinic acid and citric acid (utilizing a 3 to 1 ratio of citric acid to platinum) to provide a resulting composite containing only 0.13 troy ounce of platinum per cubic foot of alumina. The composite was then dried and reduced in the presence of hydrogen for an approximate two hour period at a temperature of about 1000° F. This resulting platinum-alumina composite was used as a reference catalyst.

In the testing operation, the catalyst was found to provide an initial hydrocarbon conversion of 61.5% and at the end of 40 hours a conversion of 44.5%, with a resulting deactivation rate of 0.57. The CO conversion was initially 80.8% and after 40 hours equivalent to 72.0% with a deactivation rate of 0.29. The lead retention after the 40 hour period was 11.2% and the peripheral crushing strength was 6.3 pounds.

*Example IV*

The alumina spheres of this example were treated with a chloroplatinic acid solution to provide a resulting dried and reduced composite the same as Example III with approximately 0.13 troy ounce of platinum per cubic foot of alumina. Subsequently these reduced platinum-alumina spheres were treated stepwise with a barium hydroxide solution and with a solution of chromic acid to provide a resulting composite with about 10% barium and 3.8% chromium by weight of the finished composite after drying and calcining in air for 2 hours at 1000° F.

The catalyst testing for this sample was found to provide an initial hydrocarbon conversion of 70.5% and after 40 hours a conversion of 58.9% with a lowered deactivation rate of 0.39. The CO conversion was initially 83.7% and after 40 hours 78.2%, with the deactivation rate being 0.18. Lead retention after the 40 hour test period was 10.3% and peripheral crushing strength of 5.7 pounds. It may be noted that the barium chromate containing composite provided improved activity and stability, together with a relatively low lead retention as compared with the reference catalyst which had poor stability for hydrocarbon conversion with this low amount of platinum present.

*Example V*

The alumina-platinum spheres of this example were prepared as in Examples III and IV to provide a resulting dried and reduced composite with approximately 0.13 troy ounce of platinum per cubic foot of alumina. Subsequently the platinum-alumina spheres were treated with a barium hydroxide solution to provide 5% barium by weight of the composite rather than 10%. The impregnation with the chromic acid solution was also modified to reduce the chromium content to 1.9% by weight of the finished composite.

The catalyst testing procedure found an initial hydrocarbon conversion of 63.0% and after 40 hours a conversion of 52.5% with a deactivation rate of 0.35. The CO conversion was initially 82.7% and after 40 hours 76.4%, with a deactivation rate of 0.21. Lead retention after the 40 hour test period was 10.9% and peripheral crushing strength 6.3 pounds.

A comparison of results from these last three examples indicates that the approximately 5% barium chromate deposition was slightly less effective than the 10% barium chromate deposition in combination with a low platinum content catalyst. However, it may also be noted that the barium chromate content greatly enhances the poor activity of this catalyst which had only about one-fourth as much platinum content as the reference catalyst of Example I.

*Example VI*

The alumina spheres of this example were treated with a 1.25 molar ratio of citric acid-chloroplatinic acid solution to provide a resulting dried and reduced composite with approximately 0.47 troy ounce of platinum per cubic foot of alumina. Subsequently the platinum-alumina spheres after reduction in hydrogen were treated in separate impregnations with a barium hydroxide solution and a chromic acid solution to provide approximately 20% barium and 7.6% chromium by weight of the dried and calcined composite.

The catalyst testing procedure showed an initial hydrocarbon conversion of 68.5% and after 40 hours a conversion of 61.0% with a deactivation rate of 0.25. The CO conversion was initially 80.3% and after 40 hours 73.9%, with the deactivation rate equal to 0.21. Lead retention after the 40 hour test period was 8.6% and peripheral crushing strength of 2.6 pounds.

*Example VII*

The alumina spheres of this example were, like those of Example I, treated with a citric acid-chloroplatinic acid solution to provide a resulting dried and reduced composite with approximately 0.47 troy ounce of platinum-alumina spheres after a hydrogen reduction step successively were treated with a magnesium hydroxide solution and with a chromic acid solution to provide a resulting dried and calcined catalyst with a magnesium chromate deposition containing approximately 1.7% magnesium and 3.8% chromium by weight of the finished composite.

The catalyst testing procedure showed an initial hydrocarbon conversion of 64.5% and after 40 hours of conversion of 53.8% with a deactivation rate of 0.36. The CO conversion was initially 75.2% and after 40 hours 69.2%, with a deactivation rate of 0.20. Lead retention after the 40 hour test period was 11.3% and peripheral crushing strength 4.1 pounds.

*Example VIII*

The alumina-platinum base spheres of this example were like those of the reference catalyst and of the previous Example VII, with 0.47 troy ounce of platinum per cubic foot of alumina; however, in this instance the reduced platinum-alumina spheres were treated successively with a calcium hydroxide solution and a chronic acid solution to provide a resulting dried and calcined composite with approximately 2.9% calcium and 3.8% chromium.

The catalyst testing procedure showed an initial hydrocarbon conversion of only 21.4% and after 40 hours a conversion of 12.8% with a deactivation rate of 0.29. The CO conversion was initially 27.2% and after 40 hours 20.5% with a deactivation rate of 0.22. Lead retention after the 40 hour test period was 7.5% and peripheral crushing strength 3.9 pounds.

*Example IX*

The alumina-platinum base spheres of this example were like those of the prior two examples, but, for this test, were treated successively with a strontium hydroxide solution and with a chromic acid solution to provide a resulting dried and calcined composite with approximately 6.4% strontium and 3.8% chromium. Following the double impregnation the spheres were dried and calcined in air at 1000° F. for about two hours in accordance with the procedure for the other chromate composites.

The standard catalyst testing procedure resulted in an initial hydrocarbon conversion of 58.7% and after 40 hours a conversion of 47.1% with a deactivation rate of 0.39. The CO conversion was initially 76.5% and after 40 hours 70.7% with the deactivation rate being 0.19. Lead retention after the 40 hour test period was 9.8% and peripheral crushing strength 4.6 pounds.

*Example X*

In this example alumina-platinum spheres prepared in accordance with the prior examples, were after drying and reducing subjected to impregnation with a 17.8% solution of barium-vanadate ($Ba_2V_2O_7$) to provide approximately 10% barium upon the catalyst composite after drying and calcining in air at about 1000° F. for a two hour period.

The catalyst test procedure for this catalyst showed an initial hydrocarbon conversion of 59.0% and after 40 hours a conversion of 40.3%. The deactivation rate was high providing a 0.62 decrease in present conversion per hour. The CO conversion was initially 79.8% and after 40 hours 75.0% providing a deactivation rate of 0.16. Lead retention after the 40 hour test period was 13.5% and peripheral crushing strength was 3.6 pounds.

*Example XI*

Alumina-platinum spheres for this example were, after drying and reducing, subject to an impregnation with a 28% solution of barium tungstate to provide approximately 10% barium in the deposition after drying and calcining in air at about 1000° F. for a two hour period.

The catalyst testing procedure in this instance provided an initial hydrocarbon conversion of 62.6% and after 40 hours a conversion of 39.5%, with a deactivation rate of 0.77. The CO conversion was initially 81.0% and after 40 hours 72.6% with a deactivation rate of 0.28. Lead retention after the 40 hour test period was 10.3% and peripheral crushing strength 3.8 pounds.

*Example XII*

In this example alumina-platinum spheres which have been dried and reduced in hydrogen were subjected to impregnation with a 21.6% solution of barium molybdate in a manner effecting approximately 10% barium by weight of the resulting dried and calcined composite.

In the catalyst testing procedure there was an initial hydrocarbon conversion of 63.5% and after 40 hours a conversion of 39.9% with a deactivation rate of 0.79. The CO conversion was initially 81.6% and after 40 hours 73.5%, with the resulting deactivation rate of 0.27. Lead retention after the 40 hour test period was 9.3% and peripheral crushing strength 3.9 pounds.

*Example XIII*

Alumina spheres in this example were treated with a 3 to 1 molar ratio of citric acid-chloroplatinic acid solution to provide a resulting composite containing 0.13 troy ounce of platinum per cubic foot of alumina. Subsequently the platinum-alumina spheres were treated with a barium hydroxide solution and with a chromic acid solution in amounts to provide for a barium dichromate coating on the catalyst composite, with approximately 5% barium and 3.8% chromium by weight of the composite.

The catalyst testing procedure showed an initial hydrocarbon conversion of 65.5% and after 40 hours a conversion of 52.8%, with a deactivation rate of 0.42. The CO conversion was initially 82.6% and after 40 hours 74.9%, with a deactivation rate of 0.26. Lead retention after the 40 hour test period was 11.1% and peripheral crushing strength 6.4 pounds.

*Example XIV*

The catalyst composite of this example was prepared in a manner similar to that set forth in the foregoing Example XIII except that the barium hydroxide solution and the chromic acid solution were provided to effect the barium dichromate coating with approximately 10% barium and 7.6% chromium by weight of the composite.

The catalyst testing procedure for this example found an initial hydrocarbon conversion of 67.1% and after 40 hours a conversion of 54.3% with a deactivation rate of 0.43. The CO conversion was initially 82.2% and after 40 hours 74.5%, with a deactivation rate of 0.26. Lead retention after the 40 hour test period was 9.9% and peripheral crushing strength equal to 7.2 pounds.

*Example XV*

Alumina spheres in this test were treated with a 3 to 1 molar ratio of citric acid-chloroplatinic acid solution to provide a resulting composite containing 0.13 troy ounce of platinum per cubic foot of alumina. Subsequently the alumina-platinum spheres were treated with a barium hydroxide solution and with a chromic acid solution in amounts to provide a barium chromate coating with approximately 3% barium and 1.1% chromium by weight of the composite.

The catalyst testing procedure showed an initial hydrocarbon conversion of 66.7% and after 40 hours a conversion of 53.7%, with a deactivation rate of 0.43. The CO conversion was initially 83.7% and after 40 hours 73.2%, with a deactivation rate 0.35. Lead retention after the 40 hour test period was 9.7% and peripheral crushing strength 5.7 pounds.

For convenience in comparing the resulting test data, the foregoing Examples I through XIV are recapitulated in the accompanying Table I.

It will be noted in connection with Examples VII, VIII and XI that none of the other components of Group II–A of the Periodic Table of elements which were tested provided conversion efficiencies that were comparable to those tests which included barium chromate deposition on the catalyst composite. In may also be noted in connection with Examples X, XI and XII that the other barium salts which were tested were not in any way comparable to the catalyst composites containing barium chromate either in activity or in rates of deactivation. All had relatively low hydrocarbon conversion activity and all had a relatively high rate of deactivation with respect to hydrocarbon conversion over the 40 hour test period.

It may be further noted that when comparing Examples XII and XIV with the reference catalyst of Example III or with the test catalyst of Example V (all having 0.13 troy ounce of platinum per cubic foot of alumina) that the barium dichromate coatings on the catalyst composite provide improved exhaust gas oxidation characteristics, although not necessarily better than results with the barium chromate additions. It may be further noted that there was very little difference in activity between the barium dichromate catalyst composite having approximately 10% barium, as compared with the 5% barium content, since both catalysts provdied closely related results and deactivation rates. On the other hand, various tests have shown that with the barium chromate coatings, there has been slightly better results obtained with 10% barium content than with the 5% or 3% contents. The test results of Example XV show an improvement over a reference sample without barium, but comparative results with 5% and 10% quantities show the latter to have the greatest activity and lowest deactivation rate. It generally appears that it is preferable to have from about 5% to about 15% of a barium chromate present in the composite, since no particular improvement was found with the 20% amount, although a broad range may well encompass amounts from 2% to about 30% of a barium chromate in the composite.

TABLE I

| Example No. | Type of Catalyst | Hydrocarbon Conversion | | | Carbon Monoxide Conversion | | | Pounds Crushing Strength | Percent Lead Retention |
|---|---|---|---|---|---|---|---|---|---|
| | | Initial | 40 Hour | Deactivation Rate, Percent conv./hr. | Initial | 40 Hour | Deactivation Rate, Percent conv./hr. | | |
| I | $Al_2O_3$+.47 tr. oz. Pt/cu. ft.+1.25 C.A.+red. in $H_2$ | 65.1 | 49.3 | .53 | 82.7 | 77.2 | .18 | 5.1 | 11.2 |
| II | $Al_2O_3$+.47 tr. oz. Pt/cu. ft.+1.25 C.A.+red. in $H_2$+ $BaCrO_4$ (10% Ba and 3.8% Cr). | 71.2 | 61.0 | .34 | 85.8 | 82.0 | .13 | 3.6 | 9.38 |
| III | $Al_2O_3$+.13 tr. oz. Pt/cu. ft.+3/1 C.A.+red. $H_2$ | 61.5 | 44.5 | .57 | 80.8 | 72.0 | .29 | 6.3 | 11.2 |
| IV | $Al_2O_3$+.13 tr. oz. Pt/cu. ft.+3/1 C.A.+red. $H_2$+ $BaCrO_4$ (10% Ba and 3.8% Cr). | 70.5 | 58.9 | .39 | 83.7 | 78.2 | .18 | 5.7 | 10.3 |
| V | $Al_2O_3$+.13 tr. oz. Pt/cu. ft.+3/1 C.A.+red. $H_2$+Ba $CrO_4$ (5% Ba and 1.9% Cr). | 63.0 | 52.5 | .35 | 82.7 | 76.4 | .21 | 6.3 | 10.9 |
| VI | $Al_2O_3$+.47 tr. oz. Pt/cu. ft.+1.25 C.A.+red. $H_2$+ $BaCrO_4$ (20% Ba and 7.6% Cr). | 68.5 | 61.0 | .25 | 80.3 | 73.9 | .21 | 2.6 | 8.6 |
| VII | $Al_2O_3$+.47 tr. oz. Pt/cu. ft.+1.25 C.A.+red. $H_2$+ $MgCrO_4$ (1.7% Mg+3.8% Cr). | 64.5 | 53.8 | .36 | 75.2 | 69.2 | .20 | 4.1 | 11.3 |
| VIII | $Al_2O_3$+.47 tr. oz. Pt/cu. ft.+1.25 C.A.+red. $H_2$+ $CaCrO_4$ (2.9% Ca and 3.8% Cr). | 21.4 | 12.8 | .29 | 27.2 | 20.5 | .22 | 3.9 | 7.5 |
| IX | $Al_2O_3$+.47 tr. oz. Pt/cu. ft.+1.25 C.A.+red. $H_2$+ $SrCrO_4$ (6.4% Sr and 3.8% Cr). | 58.7 | 47.1 | .39 | 76.5 | 70.7 | .19 | 4.6 | 9.8 |
| X | $Al_2O_3$+.47 tr. oz. Pt/cu. ft.+1.25 C.A.+red. $H_2$+17.8% $Ba_2V_2O_7$ (10% Ba). | 59.0 | 40.3 | .62 | 79.8 | 75.0 | .16 | 3.6 | 13.5 |
| XI | $Al_2O_3$+.47 tr. oz. Pt/cu. ft.+1.25 C.A.+red. $H_2$+28% $BaWO_4$ (10% Ba). | 62.6 | 39.5 | .77 | 81.0 | 72.6 | .28 | 3.8 | 10.3 |
| XII | $Al_2O_3$+.47 tr. oz. Pt/cu. ft.+1.25 C.A.+red. $H_2$+21.6% $BaMoO_4$ (10% Ba). | 63.5 | 39.9 | .79 | 81.6 | 73.5 | .27 | 3.9 | 9.3 |
| XIII | $Al_2O_3$+.13 tr. oz. Pt/cu. ft.+3/1 C.A.+red. $H_2$+12.8% $BaCr_2O_7$ (5% Ba and 3.8% Cr). | 65.5 | 52.8 | .42 | 82.6 | 74.9 | .26 | 6.4 | 11.1 |
| XIV | $Al_2O_3$+.13 tr. oz. Pt/cu. ft.+3/1 C.A.+red. $H_2$+25.6 $Ba_2CrO_7$ (10% Ba and 7.6% Cr). | 67.1 | 54.3 | .43 | 82.2 | 74.5 | .26 | 7.2 | 9.9 |
| XV | $Al_2O_3$+.13 tr. oz. Pt/cu. ft.+3/1 C.A.+red. $H_2$+ $BaCrO_4$ (3% Ba and 1.17% Cr). | 66.7 | 53.7 | .43 | 83.7 | 73.2 | .35 | 5.7 | 9.7 |

I claim as my invention:

1. A method of catalyst preparation which comprises commingling a solution of a catalytically active metal component with a refractory inorganic oxide support, drying the resultant mixture and impregnating the same with a barium hydroxide solution, drying the thus impregnated mixture and then impregnating the same with a chromic acid solution to form barium chromate on the composite of said metal component and oxide support, and drying and calcining the composite.

2. The method of claim 1 further characterized in that said metal component comprises platinum and said oxide support comprises alumina.

3. A catalyst prepared by the method of claim 1.

4. A catalyst prepared by the method of claim 7.

5. A process for the conversion of noxious exhaust gases which comprises subjecting the gases to oxidation in contact with a catalyst prepared by the method of claim 1.

6. A process for the conversion of noxious exhaust gases which comprises subjecting the gases to oxidation in contact with a catalyst prepared by the method of claim 7.

7. A method for preparing a catalytic composite of alumina, platinum and barium chromate, which comprises commingling said alumina with a solution of a platinum containing compound to provide from about .01% to about 1.0% platinum, based upon the weight of the alumina, drying the composite and reducing it in the presence of hydrogen at about 1000° F. for at least about one hour, impregnating the resulting reduced composite with a barium hydroxide solution to provide at least about 5% barium by weight thereof, drying such composite and then impregnating it with a chromic acid solution to form a resulting barium chromate on said catalyst composite and then drying and calcining the catalyst in the presence of air for at least about one hour.

8. A method of preparing an oxidizing catalyst composite which comprises impregnating a porous alumina carrier with chloroplatinic acid and with from about 0.13% to about 0.70% by weight, based upon the weight of said alumina, of an organic acid selected from the group consisting of polybasic acids and derivatives thereof, having the following structural formula:

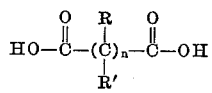

where:

R is selected from hydrogen, hydroxyl and alkyl groups;
R' is selected from hydrogen, alkyl and carboxyl groups; and
n is within the range of 0 to 6, to provide from about 0.01% to about 1% of platinum by weight of the alumina, drying the resulting mixture and reducing it in an atmosphere of hydrogen at a temperature within the range of from about 900° F. to about 1800° F., thereafter impregnating the alumina-platinum base material with a solution of barium hydroxide to provide from about 2% to about 30% barium by weight of the composite, drying the thus impregnated material and then impregnating the same with chromic acid in an amount to provide the formation of a barium chromate deposition on the catalyst surface, drying the resulting composite and then subjecting it to calcination in the presence of air at a temperature above about 1000° F.

References Cited

UNITED STATES PATENTS 3,259,454  7/1966  Michalko _____ 23—2
3,272,759  9/1966  Stiles _____ 23—2 X

OTHER REFERENCES

Economy J. et al.: Journal of Catalysis, vol. 4 (1965), presented at N.Y. meeting of Amer. Chem. Soc. 9, 1963, pps. 446–452 relied on.

K. Wieczffinsk et al.: Roczniki Chemu, vol. 36 (1962), pps. 1397–1402.

OSCAR R. VERTIZ, *Primary Examiner.*

A. J. GREIF, *Assistant Examiner.*